(12) United States Patent
Aoyama

(10) Patent No.: US 6,350,423 B1
(45) Date of Patent: Feb. 26, 2002

(54) APPARATUS AND METHOD FOR REDUCING CARBON MONOXIDE CONCENTRATION AND CATALYST FOR SELECTIVELY OXIDIZING CARBON MONOXIDE

(75) Inventor: Satoshi Aoyama, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/509,384
(22) PCT Filed: Sep. 24, 1998
(86) PCT No.: PCT/JP98/04304
  § 371 Date: Mar. 21, 2000
  § 102(e) Date: Mar. 21, 2000
(87) PCT Pub. No.: WO99/16706
  PCT Pub. Date: Apr. 8, 1999

(30) Foreign Application Priority Data

Sep. 26, 1997 (JP) .............................. 9-279694

(51) Int. Cl.$^7$ .................. B01D 53/62; B01J 23/46
(52) U.S. Cl. ................ 423/247; 422/168; 422/177; 423/437.2; 502/326; 502/329; 502/337; 502/340
(58) Field of Search ................ 422/168, 177; 423/247, 437.2; 502/326, 329, 337, 340

(56) References Cited

U.S. PATENT DOCUMENTS

| | | | |
|---|---|---|---|
| 4,536,375 A | 8/1985 | Holt et al. ............ | 423/247 |
| 4,639,432 A | 1/1987 | Holt et al. ............ | 502/324 |
| 5,250,490 A | * 10/1993 | Ritscher et al. ............ | 502/313 |
| 5,258,340 A | 11/1993 | Augustine et al. ............ | 502/60 |

FOREIGN PATENT DOCUMENTS

| | | |
|---|---|---|
| JP | 59-92022 | 5/1984 |
| JP | 5-92140 | 4/1993 |
| JP | 7-256112 | 10/1995 |
| JP | 8-133701 | 5/1996 |
| JP | 8-133702 | 5/1996 |
| JP | 8-217406 | 8/1996 |
| JP | 9-131531 | 5/1997 |
| JP | 9-199156 | 7/1997 |
| JP | 10-29803 | 2/1998 |
| JP | 10-83825 | 3/1998 |
| JP | 10-212104 | 8/1998 |

\* cited by examiner

Primary Examiner—Steven P. Griffin
Assistant Examiner—Maribel Medina
(74) Attorney, Agent, or Firm—Oliff & Berridge, PLC

(57) ABSTRACT

The present invention provides a technique of reducing the concentration of carbon monoxide included in a hydrogen rich gas, which is fed as a supply of gaseous fuel to fuel cells. It is required that the activity of a carbon monoxide selective oxidation reaction for reducing the concentration of carbon monoxide is kept at a sufficiently high level in a wider temperature range. A CO selective oxidation unit 34, which reduces the concentration of carbon monoxide included in a hydrogen rich gas fed to fuel cells 20, has a carbon monoxide selective oxidation catalyst that includes a second element, such as lithium, in addition to ruthenium as a primary component. This arrangement enables the activity of the carbon monoxide selective oxidation reaction in the CO selective oxidation unit 34 to be kept at a sufficiently high level in a wider temperature range.

26 Claims, 5 Drawing Sheets

Fig. 5

| | Catalytic Temperature | | |
|---|---|---|---|
| | 100°C | 140°C | 200°C |
| Examples | | | |
| Li additive Ru catalyst | 69 ppm | 5 ppm | 10 ppm |
| K additive Ru catalyst | 22 ppm | 4 ppm | 8 ppm |
| Ba additive Ru catalyst | 121 ppm | 7 ppm | 11 ppm |
| Ni additive Ru catalyst | 33 ppm | 3 ppm | 10 ppm |
| Zn additive Ru catalyst | 82 ppm | 9 ppm | 13 ppm |
| Comparative Example Ru Catalyst | 250 ppm | 7 ppm | 10 ppm |

APPARATUS AND METHOD FOR REDUCING CARBON MONOXIDE CONCENTRATION AND CATALYST FOR SELECTIVELY OXIDIZING CARBON MONOXIDE

BACKGROUND OF THE INVENTION

1. Field of the Invention

The present invention relates to a carbon monoxide concentration reduction apparatus, a method of reducing the concentration of carbon monoxide, and a carbon monoxide selective oxidation catalyst. More specifically the present invention pertains to a carbon monoxide concentration reduction apparatus that reduces the concentration of carbon monoxide included in a hydrogen rich gas, a corresponding method of reducing the concentration of carbon monoxide, and a carbon monoxide selective oxidation catalyst used therefor.

2. Description of Related Art

Proposed carbon monoxide concentration reduction apparatuses for reducing the concentration of carbon monoxide included in a hydrogen rich gas utilize a ruthenium catalyst carried on a carrier, such as alumina (for example, JAPANESE PATENT LAID-OPEN GAZETTE No. 8-133701, No. 8-133702, and No. 8-217406). When the hydrogen rich gas and a predetermined quantity of oxygen are fed into any of these apparatuses, the ruthenium catalyst accelerates a carbon monoxide selective oxidation reaction, which oxidizes carbon monoxide, in preference to the oxidation of hydrogen and thereby reduces the concentration of carbon monoxide included in the hydrogen rich gas.

Such a carbon monoxide concentration reduction apparatus is used in a fuel cells system including, for example, polymer electrolyte fuel cells or phosphate fuel cells. The following electrochemical reactions proceed in these fuel cells:

$$H_2 \rightarrow 2H^+ + 2e^- \quad (1)$$

$$2H^+ + 2e^- + (\tfrac{1}{2})O_2 \rightarrow H_2O \quad (2)$$

$$H_2 + (\tfrac{1}{2})O_2 \rightarrow H_2O \quad (3)$$

Equation (1) shows the reaction proceeding on the anodes of the fuel cells, Equation (2) shows the reaction proceeding on the cathodes of the fuel cells, and Equation (3) shows the reaction proceeding in the whole fuel cells. As clearly understood from these equations, for the progress of the reaction in the fuel cells, it is required to feed a supply of a hydrogen-containing gaseous fuel to the anodes and a supply of an oxygen-containing oxidant gas to the cathodes. Carbon monoxide that is present in these supplies of the gases is adsorbed on a platinum catalyst included in the fuel cells and deteriorates its catalytic ability. The air, which is generally used as the oxidant gas, does not contain carbon monoxide to the level that lowers the catalytic ability. The gaseous fuel, on the other hand, generally contains a little quantity of carbon monoxide, which may interfere with the dissociation of hydrogen proceeding on the anodes and lower the performance of the fuel cells.

The presence of carbon monoxide in the gaseous fuel is ascribed to the production of the gaseous fuel by reforming a hydrocarbon. The problem of carbon monoxide described above accordingly arises when the gaseous fuel used is not the gaseous hydrogen of a high purity but the hydrogen rich gas produced by reforming a hydrocarbon. The fuel cells system, which utilizes the reformed gas as the gaseous fuel supplied to the fuel cells, generally has a fuel reformer unit that reforms a hydrocarbon to produce a hydrogen rich gaseous fuel, which is fed to the anodes of the fuel cells. The following shows an example of the reforming reactions to produce the hydrogen rich gas, in which methanol is steam reformed:

$$CH_3OH \rightarrow CO + 2H_2 \quad (4)$$

$$CO + H_2O \rightarrow CO_2 + H_2 \quad (5)$$

$$CH_3OH + H_2O \rightarrow CO_2 + 3H_2 \quad (6)$$

In the steam reforming reaction of methanol, the dissociation of methanol shown by Equation (4) and the reforming of carbon monoxide shown by Equation (5) simultaneously proceed. As a whole, the reaction shown by Equation (6) occurs to produce a hydrogen rich gas containing carbon dioxide. No carbon monoxide is present in the final stage if these reactions completely proceed. In the actual fuel reformer unit, however, it is practically impossible to shift the reaction of Equation (5) completely to the right. The gaseous fuel reformed by the fuel reformer unit accordingly contains a trace amount of carbon monoxide as a side product.

The steam reforming reaction generally proceeds in the presence of a known reforming catalyst like a Cu-Zn catalyst. In the presence of the reforming catalyst, however, a reverse shift reaction shown by Equation (7) given below proceeds with the steam reforming reaction discussed above, so as to generate a trace amount of carbon monoxide in the reformed gas:

$$CO_2 + H_2 \rightarrow CO + H_2O \quad (7)$$

The reverse shift reaction shown by Equation (7) produces carbon monoxide from hydrogen and carbon dioxide, which are obtained in the process of the steam reforming reaction. The reverse shift reaction proceeds only slightly, compared with the steam reforming reaction. In the case where an extremely low concentration of carbon monoxide is required, for example, when the reformed gas is used as a supply of gaseous fuel fed to the fuel cells, however, carbon monoxide produced by the reverse shift reaction is not negligible but may have a significant influence.

The carbon monoxide concentration reduction apparatus is accordingly used to reduce the concentration of carbon monoxide included in the gaseous fuel, prior to the supply of the gaseous fuel to the fuel cells. In the carbon monoxide concentration reduction apparatus, the selective oxidation of carbon monoxide proceeds in preference to the oxidation of hydrogen, which is affluently present in the reformed gas as mentioned above. The oxidation reaction of carbon monoxide is shown by Equation (8) given below. The allowable concentration of carbon monoxide included in the gaseous fuel fed to the fuel cells is not greater than several percents in the case of phosphate fuel cells and not greater than several ppm in the case of polymer electrolyte fuel cells. The reformed gas is introduced into the carbon monoxide concentration reduction apparatus including the ruthenium catalyst, and the selective oxidation of carbon monoxide shown by Equation (8) proceeds in the apparatus. This lowers the concentration of carbon monoxide included in the reformed gas and ensures the supply of the gaseous fuel having a sufficiently low concentration of carbon monoxide to the fuel cells.

$$CO + (\tfrac{1}{2})O_2 \rightarrow CO_2 \quad (8)$$

The effective temperature range of the ruthenium catalyst, in which the carbon monoxide selective oxidation reaction is sufficiently accelerated, is about 140 to 200° C. The carbon monoxide concentration reduction apparatus with the ruthenium catalyst incorporated in the fuel cells system may not sufficiently lower the concentration of carbon monoxide included in the gaseous fuel fed to the fuel cells. When the temperature in the carbon monoxide concentration reduction apparatus becomes lower than the effective temperature range, the catalytic activity lowers and does not sufficiently accelerate the oxidation of carbon monoxide. This results in the insufficient reduction of the concentration of carbon monoxide. When the temperature in the carbon monoxide concentration reduction apparatus becomes higher than the effective temperature range, on the other hand, hydrogen that is affluently present in the gaseous fuel is oxidized. This interferes with the selective oxidation of the trace amount of carbon monoxide co-existing in the gaseous fuel. In order to lower the concentration of carbon monoxide sufficiently, it is required to regulate the internal temperature of the carbon monoxide concentration reduction apparatus according to the amount of the reformed gas, which is subjected to the selective oxidation of carbon monoxide and to make the selective oxidation of carbon monoxide proceed in the effective temperature range mentioned above.

Especially in the event that the load to be processed in the carbon monoxide concentration reduction apparatus (that is, the quantity of the reformed gas fed to the carbon monoxide concentration reduction apparatus) remarkably varies, it is difficult to keep the internal temperature of the carbon monoxide concentration reduction apparatus in the effective temperature range. For example, when the fuel cells that receive the supply of gaseous fuel having the reduced concentration of carbon monoxide are used as a power source for driving a vehicle, the loading drastically varies. The variation in loading significantly varies the quantity of the reformed gas to be processed in the carbon monoxide concentration reduction apparatus. This makes it difficult to regulate the internal temperature of the carbon monoxide concentration reduction apparatus. An abrupt increase in loading leads to a remarkable increase in load to be processed in the carbon monoxide concentration reduction apparatus and may thus abruptly raise the internal temperature. Similarly an abrupt decrease in loading leads to a remarkable decrease in load to be processed in the carbon monoxide concentration reduction apparatus and may thus abruptly lower the internal temperature. In the event that the internal temperature of the carbon monoxide concentration reduction apparatus is deviated from the desirable temperature range due to the variation in loading, the above problems arise to interfere with the effective reduction of the concentration of carbon monoxide included in the reformed gas. It is accordingly desirable that the carbon monoxide selective oxidation catalyst has a wider effective temperature range, in order to keep the activity of the selective oxidation of carbon monoxide in a sufficient level under the condition of a relatively large variation in loading of the fuel cells.

The driving temperature of the fuel cells, which receive the supply of gaseous fuel fed from the carbon monoxide concentration reduction apparatus is about 80 to 100° C. in the case of polymer electrolyte fuel cells. When the temperature of the gaseous fuel fed from the carbon monoxide concentration reduction apparatus to the fuel cells is higher than the driving temperature of the fuel cells, the direct supply of the gaseous fuel from the carbon monoxide concentration reduction apparatus to the fuel cells disadvantageously increases the internal temperature of the fuel cells to an undesirable level. In the case where the temperature of the oxidation reaction proceeding in the carbon monoxide concentration reduction apparatus (that is, the regulated temperature to enable the carbon monoxide selective oxidation catalyst to sufficiently accelerate the reaction) exceeds the driving temperature range of the fuel cells, a heat exchange unit should be disposed in the flow path of the gaseous fuel that connects the carbon monoxide concentration reduction apparatus to the fuel cells. The heat exchange unit sufficiently lowers the temperature of the gaseous fuel, prior to the supply of the gaseous fuel to the fuel cells. The heat exchange unit, however, makes the piping layout rather complicated and undesirably increases the size of the whole system.

SUMMARY OF THE INVENTION

As described above, it is desirable that the catalyst used for accelerating the selective oxidation reaction of carbon monoxide has a wider effective temperature range, in which the selective oxidation of carbon monoxide is sufficiently accelerated, in case of a possible variation of the loading. It is especially preferable that the lower limit of the effective temperature range is closer to the driving temperature of the fuel cells. In the case of the ruthenium catalyst conventionally used, however, the lower limit of the effective temperature range, in which the concentration of carbon monoxide is sufficiently reduced, is about 140° C. as described previously. The ruthenium catalyst can not sufficiently accelerate the selective oxidation reaction of carbon monoxide in the driving temperature of the fuel cells, which is about 100° C.

The object of the present invention, which is actualized in the form of a carbon monoxide concentration reduction apparatus, a method of reducing concentration of carbon monoxide, and a carbon monoxide selective oxidation catalyst, is thus to extend an effective temperature range, in which the activity of a carbon monoxide selective oxidation reaction is kept sufficiently high, and especially to make the lower limit of the effective temperature range closer to the driving temperature of fuel cells.

BRIEF DESCRIPTION OF THE DRAWINGS

FIG. 5 shows the performances of various carbon monoxide selective oxidation catalysts of the present invention, each including ruthenium and a second element, and a known ruthenium catalyst at a variety of temperatures.

DETAILED DESCRIPTION OF PREFERRED EMBODIMENT

Figure 1:
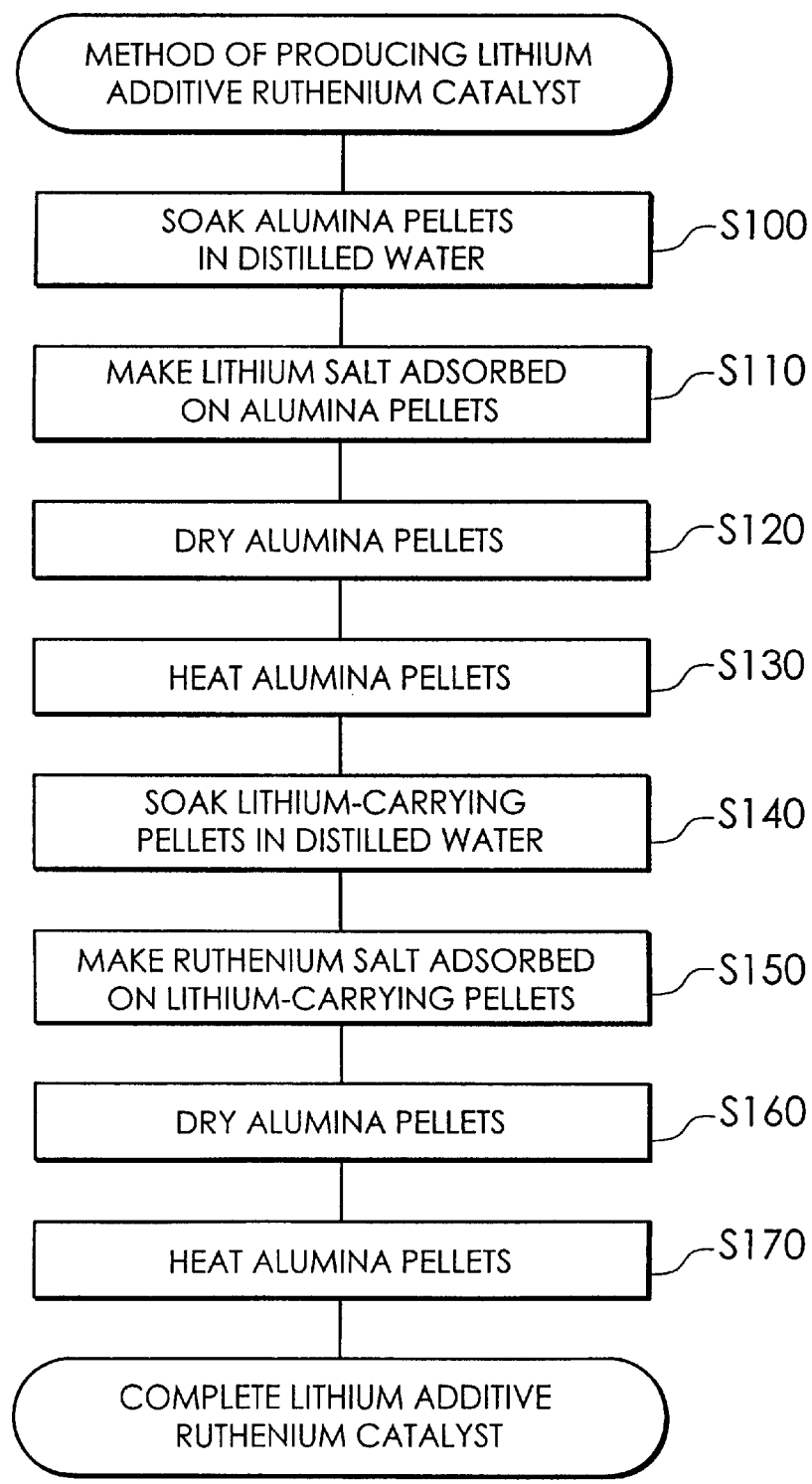
FIG. 1 is a flow chart showing a method of manufacturing a lithium additive ruthenium catalyst.

The present invention provides a first carbon monoxide concentration reduction apparatus that oxidizes carbon monoxide included in a hydrogen rich gas and thereby reduces the concentration of carbon monoxide. The first carbon monoxide concentration reduction apparatus includes: a hydrogen rich gas supply unit that feeds a supply of the hydrogen rich gas; an oxidant gas supply unit that feeds a supply of an oxygen-containing oxidant gas which is used to oxidize carbon monoxide; and a carbon monoxide selective oxidation unit that includes a carbon monoxide selective oxidation catalyst, receives the supply of the hydrogen rich gas fed from the hydrogen rich gas supply unit and the supply of the oxidant gas fed from the oxidant gas supply unit, and selectively oxidizes carbon monoxide included in the hydrogen rich gas through a carbon monoxide selective oxidation reaction for selectively oxidizing carbon monoxide, wherein the carbon monoxide selective oxidation catalyst accelerates the carbon monoxide selective oxidation reaction and has ruthenium as a primary component. In the first carbon monoxide concentration reduction apparatus, the carbon monoxide selective oxidation catalyst further includes a simple body of an alkali metal that, in combination with ruthenium, extends an effective temperature range, in which the carbon monoxide selective oxidation reaction is accelerated.

The first carbon monoxide concentration reduction apparatus of the above arrangement receives the supply of the hydrogen rich gas fed from the hydrogen rich gas supply unit and the supply of the oxidant gas fed from the oxidant gas supply unit and selectively oxidizes carbon monoxide included in the hydrogen rich gas through the carbon monoxide selective oxidation reaction, thereby reducing the concentration of carbon monoxide. The carbon monoxide selective oxidation reaction proceeds with the carbon monoxide selective oxidation catalyst, which includes the simple body of an alkali metal that, in combination with ruthenium, extends an effective temperature range, in which the carbon monoxide selective oxidation reaction is accelerated, in addition to ruthenium as the primary component.

The present invention is also directed to a corresponding first method of oxidizing carbon monoxide included in a hydrogen rich gas and thereby reducing the concentration of carbon monoxide. The first method includes the steps of mixing the hydrogen rich gas with an oxygen-containing oxidant gas for oxidizing carbon monoxide; and oxidizing carbon monoxide included in the hydrogen rich gas, which has been mixed with the oxidant gas, through a carbon monoxide selective oxidation reaction for selectively oxidizing carbon monoxide using a carbon monoxide selective oxidation catalyst, wherein the carbon monoxide selective oxidation catalyst accelerates the carbon monoxide selective oxidation reaction, has ruthenium as a primary component, and further includes a simple body of an alkali metal that extends an effective temperature range, in which the carbon monoxide selective oxidation reaction is accelerated.

The present invention is further directed to a corresponding first carbon monoxide selective oxidation catalyst, which accelerates a carbon monoxide selective oxidation reaction that selectively oxidizes carbon monoxide included in a hydrogen rich gas. The first carbon monoxide selective oxidation catalyst has ruthenium as a primary component, which is carried on a predetermined carrier, and further includes a simple body of an alkali metal that, in combination with ruthenium, extends an effective temperature range in which the carbon monoxide selective oxidation reaction is accelerated.

The arrangement of the first carbon monoxide concentration reduction apparatus, the first method of reducing concentration of carbon monoxide, and the first carbon monoxide selective oxidation catalyst of the present invention further extends the effective temperature range in which the carbon monoxide selective oxidation reaction is accelerated. Compared with the prior art arrangement using the ruthenium catalyst, this arrangement of the present invention enables the concentration of carbon monoxide included in the hydrogen rich gas to be reduced sufficiently in a wider temperature range. This arrangement facilitates the process of regulating the temperature of the carbon monoxide selective oxidation catalyst to the effective temperature range, in which the concentration of carbon monoxide included in the hydrogen rich gas is sufficiently reduced. This arrangement is especially advantageous when the load to be processed in the carbon monoxide concentration reduction apparatus (that is, the quantity of the hydrogen rich gas fed to the carbon monoxide concentration reduction apparatus) varies, for example, when the hydrogen rich gas having the reduced concentration of carbon monoxide by the carbon monoxide concentration reduction apparatus is fed as a gaseous fuel to fuel cells having the variable loading connected thereto. A variation in quantity of the hydrogen rich gas, which is the object of the reduction of carbon monoxide concentration, changes the calorimetric value generated by the carbon monoxide selective oxidation reaction and varies the temperature of the carbon monoxide selective oxidation catalyst. Even under the condition of varying catalytic temperatures, the wider temperature range, in which the concentration of carbon monoxide is sufficiently reduced, enables the state of sufficiently reducing the concentration of carbon monoxide to be kept stably.

The effects of the co-presence of an alkali metal with ruthenium may be ascribed to the following reason. The co-presence of an alkali metal with ruthenium causes S electrons included in the alkali metal to shift to the conduction band of ruthenium. This facilitates the dissociation of oxygen adsorbed on ruthenium or the adsorption of carbon monoxide on ruthenium, thereby improving the activity of accelerating the carbon monoxide selective oxidation reaction.

In the first carbon monoxide concentration reduction apparatus, the first method of reducing concentration of carbon monoxide, and the first carbon monoxide selective oxidation catalyst of the present invention, the alkali metal may be either one of lithium and potassium.

In the first carbon monoxide concentration reduction apparatus, the first method of reducing concentration of carbon monoxide, and the first carbon monoxide selective oxidation catalyst of the present invention, the effective temperature range, in which the carbon monoxide selective oxidation reaction is accelerated, is extended especially to the low temperatures. This arrangement desirably simplifies or even omits the process of decreasing the temperature of the hydrogen rich gas having the reduced concentration of carbon monoxide, prior to the supply of the hydrogen rich gas having the reduced concentration of carbon monoxide as a gaseous fuel, for example, to polymer electrolyte fuel cells.

The present invention provides a second carbon monoxide concentration reduction apparatus that oxidizes carbon monoxide included in a hydrogen rich gas and thereby reduces concentration of carbon monoxide. The second carbon monoxide concentration reduction apparatus includes: a hydrogen rich gas supply unit that feeds a supply of the hydrogen rich gas; an oxidant gas supply unit that feeds a supply of an oxygen-containing oxidant gas, which is used to oxidize carbon monoxide; and a carbon monoxide selective oxidation unit that includes a carbon monoxide selective oxidation catalyst, receives the supply of the hydrogen rich gas fed from the hydrogen rich gas supply unit and the supply of the oxidant gas fed from the oxidant gas supply unit, and selectively oxidizes carbon monoxide included in the hydrogen rich gas through a carbon monoxide selective oxidation reaction for selectively oxidizing carbon monoxide, wherein the carbon monoxide selective oxidation catalyst accelerates the carbon monoxide selective oxidation reaction and has ruthenium as a primary component. In the second carbon monoxide concentration reduction apparatus, the carbon monoxide selective oxidation catalyst further includes a simple body of an alkaline earth metal that, in combination with ruthenium, extends an effective temperature range, in which the carbon monoxide selective oxidation reaction is accelerated.

The second carbon monoxide concentration reduction apparatus of the above arrangement receives the supply of the hydrogen rich gas fed from the hydrogen rich gas supply unit and the supply of the oxidant gas fed from the oxidant gas supply unit and selectively oxidizes carbon monoxide included in the hydrogen rich gas through the carbon monoxide selective oxidation reaction, thereby reducing the concentration of carbon monoxide.

The carbon monoxide selective oxidation reaction proceeds with the carbon monoxide selective oxidation catalyst, which includes the simple body of an alkaline earth metal that, in combination with ruthenium, extends an effective temperature range, in which the carbon monoxide selective oxidation reaction is accelerated, in addition to ruthenium as the primary component.

The present invention is also directed to a corresponding second method of oxidizing carbon monoxide included in a hydrogen rich gas and thereby reducing concentration of carbon monoxide. The second method includes the steps of mixing the hydrogen rich gas with an oxygen-containing oxidant gas for oxidizing carbon monoxide; and oxidizing carbon monoxide included in the hydrogen rich gas, which has been mixed with the oxidant gas, through a carbon monoxide selective oxidation reaction for selectively oxidizing carbon monoxide using a carbon monoxide selective oxidation catalyst, wherein the carbon monoxide selective oxidation catalyst accelerates the carbon monoxide selective oxidation reaction, has ruthenium as a primary component, and further includes a simple body of an alkaline earth metal that extends an effective temperature range, in which the carbon monoxide selective oxidation reaction is accelerated.

The present invention is further directed to a corresponding second carbon monoxide selective oxidation catalyst, which accelerates a carbon monoxide selective oxidation reaction that selectively oxidizes carbon monoxide included in a hydrogen rich gas. The second carbon monoxide selective oxidation catalyst has ruthenium as a primary component, which is carried on a predetermined carrier, and further includes a simple body of an alkaline earth metal that, in combination with ruthenium, extends an effective temperature range, in which the carbon monoxide selective oxidation reaction is accelerated.

The arrangement of the second carbon monoxide concentration reduction apparatus, the second method of reducing concentration of carbon monoxide, and the second carbon monoxide selective oxidation catalyst of the carbon monoxide selective oxidation reaction is accelerated. Compared with prior art arrangement the prior arrangement using the ruthenium catalyst, this arrangement of the present invention enables the concentration of carbon monoxide included in the hydrogen rich gas to be reduced sufficiently in a wider temperature range. Like the first carbon monoxide concentration reduction apparatus, the first method of reducing concentration of carbon monoxide, and the first carbon monoxide selective oxidation catalyst of the present invention discussed above, this arrangement facilitates the process of regulating the temperature of the carbon monoxide selective oxidation catalyst. Even when the quantity of the hydrogen rich gas, which is the object of the reduction of carbon monoxide concentration, varies, the wider temperature range in which the concentration of carbon monoxide is sufficiently reduced enables the state of sufficiently reducing the concentration of carbon monoxide to be kept stably.

In the second carbon monoxide concentration reduction apparatus, the second method of reducing concentration of carbon monoxide, and the second carbon monoxide selective oxidation catalyst of the present invention, the alkaline earth metal may be barium. In the second carbon monoxide concentration reduction apparatus, the second method of reducing concentration of carbon monoxide, and the second carbon monoxide selective oxidation catalyst of the present invention, the effective temperature range, in which the carbon monoxide selective oxidation reaction is accelerated, is extended especially to the low temperatures. This arrangement desirably simplifies or even omits the process of decreasing the temperature of the hydrogen rich gas having the reduced concentration of carbon monoxide, prior to the supply of the hydrogen rich gas having the reduced concentration of carbon monoxide as a gaseous fuel, for example, to polymer electrolyte fuel cells.

As described previously, like the first carbon monoxide selective oxidation catalyst of the present invention, the carbon monoxide selective oxidation catalyst used in the first carbon monoxide concentration reduction apparatus or the first method of reducing the concentration of carbon monoxide of the present invention includes the simple body of an alkali metal, in addition to ruthenium. Like the second carbon monoxide selective oxidation catalyst of the present invention, the carbon monoxide selective oxidation catalyst used in the second carbon monoxide concentration reduction apparatus or the second method of reducing the concentration of carbon monoxide of the present invention includes the simple body of an alkaline earth metal, in addition to ruthenium. The simple body of the alkali metal or the alkaline earth metal has the higher oxygen adsorption ability in a hydrogen atmosphere and thereby the greater contribution to the acceleration of the selective oxidation reaction of carbon monoxide, compared with the compound of the alkali metal or the alkaline earth metal. The co-presence of the alkali metal or the alkaline earth metal in the form of the simple body with ruthenium thus further improves the performance of the carbon monoxide selective oxidation catalyst.

The present invention provides a third carbon monoxide concentration reduction apparatus that oxidizes carbon monoxide included in a hydrogen rich gas and thereby reduces concentration of carbon monoxide. The third carbon monoxide concentration reduction apparatus includes: a hydrogen rich gas supply unit that feeds a supply of the hydrogen rich gas; an oxidant gas supply unit that feeds a supply of an oxygen-containing oxidant gas, which is used to oxidize carbon monoxide; and a carbon monoxide selective oxidation unit that includes a carbon monoxide selective oxidation catalyst, receives the supply of the hydrogen rich gas fed from the hydrogen rich gas supply unit and the supply of the oxidant gas fed from the oxidant gas supply unit, and selectively oxidizes carbon monoxide included in the hydrogen rich gas through a carbon monoxide selective oxidation reaction for selectively oxidizing carbon monoxide, wherein the carbon monoxide selective oxidation catalyst accelerates the carbon monoxide selective oxidation reaction and has ruthenium as a primary component. In the third carbon monoxide concentration reduction apparatus, the carbon monoxide selective oxidation catalyst further includes nickel.

The third carbon monoxide concentration reduction apparatus of the above arrangement receives the supply of the hydrogen rich gas fed from the hydrogen rich gas supply unit and the supply of the oxidant gas fed from the oxidant gas supply unit and selectively oxidizes carbon monoxide included in the hydrogen rich gas through the carbon monoxide selective oxidation reaction, thereby reducing the concentration of carbon monoxide. The carbon monoxide selective oxidation reaction proceeds with the carbon monoxide selective oxidation catalyst, which includes nickel in addition to ruthenium as the primary component.

The present invention is also directed to a corresponding third method of oxidizing carbon monoxide included in a hydrogen rich gas and thereby reducing concentration of carbon monoxide. The third method includes the steps of mixing the hydrogen rich gas with an oxygen-containing oxidant gas for oxidizing carbon monoxide; and reducing the concentration of carbon monoxide included in the hydrogen rich gas, which has been mixed with the oxidant gas, through a carbon monoxide selective oxidation reaction for selectively oxidizing carbon monoxide using a carbon monoxide selective oxidation catalyst, wherein the carbon monoxide selective oxidation catalyst accelerates the carbon monoxide selective oxidation reaction, has ruthenium as a primary component, and further includes nickel.

The present invention is further directed to a corresponding third carbon monoxide selective oxidation catalyst, which accelerates a carbon monoxide selective oxidation reaction that selectively oxidizes carbon monoxide included in a hydrogen rich gas. The third carbon monoxide selective oxidation catalyst has ruthenium as a primary component, which is carried on a predetermined carrier, and further includes nickel.

The arrangement of the third carbon monoxide concentration reduction apparatus, the third method of reducing concentration of carbon monoxide, and the third carbon monoxide selective oxidation catalyst of the present invention further extends the effective temperature range, in which the carbon monoxide selective oxidation reaction is accelerated. Compared with the prior art arrangement using the ruthenium catalyst, this arrangement of the present invention enables the concentration of carbon monoxide included in the hydrogen rich gas to be reduced sufficiently in a wider temperature range. Like the first and the second carbon monoxide concentration reduction apparatuses, the first and the second methods of reducing concentration of carbon monoxide, and the first and the second carbon monoxide selective oxidation catalysts of the present invention discussed above, this arrangement facilitates the process of regulating the temperature of the carbon monoxide selective oxidation catalyst. Even when the quantity of the hydrogen rich gas, which is the object of the reduction of carbon monoxide concentration, varies, the wider temperature range, in which the concentration of carbon monoxide is sufficiently reduced, enables the state of sufficiently reducing the concentration of carbon monoxide to be kept stably. The effective temperature range, in which the carbon monoxide selective oxidation reaction is accelerated, is extended especially to the low temperatures. This arrangement desirably simplifies or even omits the process of decreasing the temperature of the from hydrogen rich gas having the reduced concentration of carbon monoxide, prior to the supply of the hydrogen rich gas having the reduced concentration of carbon monoxide as a gaseous fuel, for example, to polymer electrolyte fuel cells.

The present invention provides a fourth carbon monoxide concentration reduction apparatus that oxidizes carbon monoxide included in a hydrogen rich gas and thereby reduces concentration of carbon monoxide. The fourth carbon monoxide concentration reduction apparatus includes: a hydrogen rich gas supply unit that feeds a supply of the hydrogen rich gas; an oxidant gas supply unit that feeds a supply of an oxygen-containing oxidant gas, which is used to oxidize carbon monoxide; and a carbon monoxide selective oxidation unit that includes a carbon monoxide selective oxidation catalyst, receives the supply of the hydrogen rich gas fed from the hydrogen rich gas supply unit and the supply of the oxidant gas fed from the oxidant gas supply unit, and selectively oxidizes carbon monoxide included in the hydrogen rich gas through a carbon monoxide selective oxidation reaction for selectively oxidizing carbon monoxide, wherein the carbon monoxide selective oxidation catalyst accelerates the carbon monoxide selective oxidation reaction and has ruthenium as a primary component. In the fourth carbon monoxide concentration reduction apparatus, the carbon monoxide selective oxidation catalyst further includes zinc. The fourth carbon monoxide concentration reduction apparatus of the above arrangement receives the supply of the hydrogen rich gas fed from the hydrogen rich gas supply unit and the supply of the oxidant gas fed from the oxidant gas supply unit and selectively oxidizes carbon monoxide included in the hydrogen rich gas through the carbon monoxide selective oxidation reaction, thereby reducing the concentration of carbon monoxide. The carbon monoxide selective oxidation reaction proceeds with the carbon monoxide selective oxidation catalyst, which includes zinc in addition to ruthenium as the primary component.

The present invention is also directed to a corresponding fourth method of oxidizing carbon monoxide included in a hydrogen rich gas and thereby reducing concentration of carbon monoxide. The fourth method includes the steps of: mixing the hydrogen rich gas with an oxygen-containing oxidant gas for oxidizing carbon monoxide; and reducing the concentration of carbon monoxide included in the hydrogen rich gas, which has been mixed with the oxidant gas, through a carbon monoxide selective oxidation reaction for selectively oxidizing carbon monoxide using a carbon monoxide selective oxidation catalyst, wherein the carbon monoxide selective oxidation catalyst accelerates the carbon monoxide selective oxidation reaction, has ruthenium as a primary component, and further includes zinc.

The present invention is further directed to a corresponding fourth carbon monoxide selective oxidation catalyst, which accelerates a carbon monoxide selective oxidation reaction that selectively oxidizes carbon monoxide included in a hydrogen rich gas. The fourth carbon monoxide selective oxidation catalyst has ruthenium as a primary component, which is carried on a predetermined carrier, and further includes zinc.

The arrangement of the fourth carbon monoxide concentration reduction apparatus, the fourth method of reducing concentration of carbon monoxide, and the fourth carbon monoxide selective oxidation catalyst of the present invention further extends the effective temperature range, in which the carbon monoxide selective oxidation reaction is accelerated. Compared with the prior art arrangement using the ruthenium catalyst, this arrangement of the present invention enables the concentration of carbon monoxide included in the hydrogen rich gas to be reduced sufficiently in a wider temperature range. Like the first through the third carbon monoxide concentration reduction apparatuses, the first through the third methods of reducing concentration of carbon monoxide, and the first through the third carbon monoxide selective oxidation catalysts of the present invention discussed above, this arrangement facilitates the process of regulating the temperature of the carbon monoxide selective oxidation catalyst. Even when the quantity of the hydrogen rich gas, which is the object of the reduction of carbon monoxide concentration, varies, the wider temperature range, in which the concentration of carbon monoxide is sufficiently reduced, enables the state of sufficiently reducing the concentration of carbon monoxide to be kept stably. The effective temperature range, in which the carbon monoxide selective oxidation reaction is accelerated, is extended especially to the low temperatures. This arrangement desirably simplifies or even omits the process of decreasing the temperature of the hydrogen rich gas having the reduced concentration of carbon monoxide, prior to the supply of the hydrogen rich gas having the reduced concentration of carbon monoxide as a gaseous fuel, for example, to polymer electrolyte fuel cells.

The present invention provides a fifth carbon monoxide concentration reduction apparatus that oxidizes carbon monoxide included in a hydrogen rich gas and thereby reduces concentration of carbon monoxide. The fifth carbon monoxide concentration apparatus includes: a hydrogen rich gas supply unit that feeds a supply of the hydrogen rich gas; an oxidant gas supply unit that feeds a supply of an oxygen-containing oxidant gas, which is used to oxidize carbon monoxide; and a carbon monoxide selective oxidation unit that includes a carbon monoxide selective oxidation catalyst, receives the supply of the hydrogen rich gas fed from the hydrogen rich gas supply unit and the supply of the oxidant gas fed from the oxidant gas supply unit, and selectively oxidizes carbon monoxide included in the hydrogen rich gas through a carbon monoxide selective oxidation reaction for selectively oxidizing carbon monoxide, wherein the carbon monoxide selective oxidation catalyst accelerates the carbon monoxide selective oxidation reaction and has ruthenium as a primary component. In the fifth carbon monoxide concentration reduction apparatus, the carbon monoxide selective oxidation catalyst further includes an alkali metal that, in combination with ruthenium, extends an effective temperature range, in which the carbon monoxide selective oxidation reaction is accelerated, and the alkali metal is obtained by reducing an alkali metal salt.

The present invention is also directed to a corresponding fifth carbon monoxide selective oxidation catalyst, which accelerates a carbon monoxide selective oxidation reaction that selectively oxidizes carbon monoxide included in a hydrogen rich gas. The fifth carbon monoxide selective oxidation catalyst has ruthenium as a primary component, which is carried on a predetermined carrier, and further includes an alkali metal that, in combination with ruthenium, extends an effective temperature range, in which the carbon monoxide selective oxidation reaction is accelerated, wherein the alkali metal is obtained by reducing an alkali metal salt.

In the fifth carbon monoxide concentration reduction apparatus and the fifth carbon monoxide selective oxidation catalyst of the present invention, the alkali metal included in the carbon monoxide selective oxidation catalyst is obtained by reducing an alkali metal salt to the simple body of the alkali metal. The presence of the alkali metal in the form of the simple body ensures the effects discussed above with regard to the first carbon monoxide concentration reduction apparatus and the first carbon monoxide selective oxidation catalyst of the present invention.

The present invention provides a sixth carbon monoxide concentration reduction apparatus that oxidizes carbon monoxide included in a hydrogen rich gas and thereby reduces concentration of carbon monoxide. The sixth carbon monoxide concentration reduction apparatus includes: a hydrogen rich gas supply unit that feeds a supply of the hydrogen rich gas; an oxidant gas supply unit that feeds a supply of an oxygen-containing oxidant gas, which is used to oxidize carbon monoxide; and a carbon monoxide selective oxidation unit that includes a carbon monoxide selective oxidation catalyst, receives the supply of the hydrogen rich gas fed from the hydrogen rich gas supply unit and the supply of the oxidant gas fed from the oxidant gas supply unit, and selectively oxidizes carbon monoxide included in the hydrogen rich gas through a carbon monoxide selective oxidation reaction for selectively oxidizing carbon monoxide, wherein the carbon monoxide selective oxidation catalyst accelerates the carbon monoxide selective oxidation reaction and has ruthenium as a primary component. In the sixth carbon monoxide concentration reduction apparatus, the carbon monoxide selective oxidation catalyst further includes an alkaline earth metal that, in combination with ruthenium, extends an effective temperature range, in which the carbon monoxide selective oxidation reaction is accelerated, and the alkaline earth metal is obtained by reducing an alkaline earth metal salt.

The present invention is also directed to a corresponding sixth carbon monoxide selective oxidation catalyst, which accelerates a carbon monoxide selective oxidation reaction that selectively oxidizes carbon monoxide included in a hydrogen rich gas. The sixth carbon monoxide selective oxidation catalyst as ruthenium as a primary component, which is carried on a predetermined carrier, and further includes an alkaline earth metal that, in combination with ruthenium, extends an effective temperature range, in which the carbon monoxide selective oxidation reaction is accelerated, wherein the alkaline earth metal is obtained by reducing an alkaline earth metal salt.

In the sixth carbon monoxide concentration reduction apparatus and the sixth carbon monoxide selective oxidation catalyst of the present invention, the alkaline earth metal included in the carbon monoxide selective oxidation catalyst is obtained by reducing an alkaline earth metal salt to the simple body of the alkaline earth metal. The presence of the alkaline earth metal in the form of the simple body ensures the effects discussed above with regard to the second carbon monoxide concentration reduction apparatus and the second carbon monoxide selective oxidation catalyst of the present invention.

The present invention provides a seventh carbon monoxide selective oxidation catalyst, which accelerates a carbon monoxide selective oxidation reaction that selectively oxidizes carbon monoxide included in a hydrogen rich gas. The seventh carbon monoxide selective oxidation catalyst has ruthenium as a primary component, which is carried on a predetermined carrier, and further includes an alkali metal that, in combination with ruthenium, extends an effective temperature range, in which the carbon monoxide selective oxidation reaction is accelerated, wherein the alkali metal and ruthenium are carried in the form of an alloy on the predetermined carrier.

The present invention provides an eighth carbon monoxide selective oxidation catalyst, which accelerates a carbon monoxide selective oxidation reaction that selectively oxidizes carbon monoxide included in a hydrogen rich gas. The eighth carbon monoxide selective oxidation catalyst has ruthenium as a primary component, which is carried on a predetermined carrier, and further includes an alkaline earth metal that, in combination with ruthenium, extends an effective temperature range in which the carbon monoxide selective oxidation reaction is accelerated, wherein the alkaline earth metal and ruthenium are carried in the form of an alloy on the predetermined carrier.

The seventh carbon monoxide selective oxidation catalyst and the eighth carbon monoxide selective oxidation catalyst of the present invention have the same effects as those of the first and the second carbon monoxide selective oxidation catalysts discussed above. The alloy of ruthenium and the alkali metal or the alkaline earth metal makes ruthenium and the alkali metal or the alkaline earth metal closer to each other microscopically. It is accordingly expected to further activate the interaction between ruthenium and the alkali metal or the alkaline earth metal working as the carbon monoxide selective oxidation catalyst.

In the seventh carbon monoxide selective oxidation catalyst, the alkali metal may be either one of lithium and potassium.

In the eighth carbon monoxide selective oxidation catalyst, the alkaline earth metal may be barium.

Figure 2:
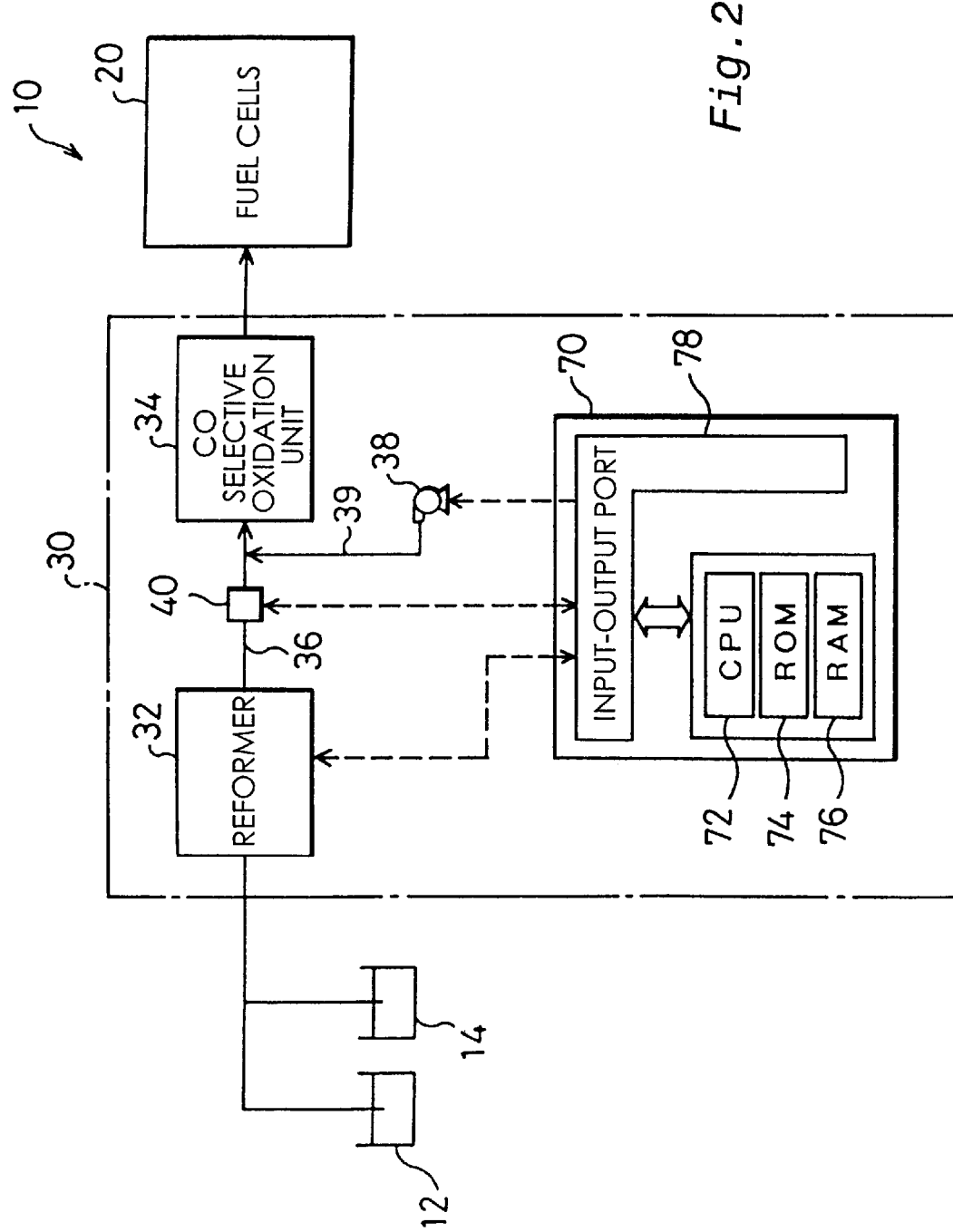
FIG. 2 schematically illustrates the structure of a fuel cells system 10.

A best mode for carrying out the present invention is described as an embodiment, in order to make the arrangements, the functions, and the effects of the present invention, which are discussed above, more apparent. FIG. 1 is a flowchart showing a method of manufacturing a lithium additive ruthenium catalyst, which corresponds to a main part of the present invention. FIG. 2 schematically illustrates the structure of a fuel cells system 10 including a carbon monoxide concentration reduction apparatus, which uses the lithium additive ruthenium catalyst. The carbon monoxide selective oxidation catalyst used in this embodiment is obtained by making a certain amount of ruthenium and a smaller amount of lithium carried on alumina pellets. In the description hereinafter, this carbon monoxide selective oxidation catalyst is referred to as the lithium additive ruthenium catalyst. In the fuel cells system 10 of this embodiment, the lithium additive ruthenium catalyst included in the carbon monoxide concentration reduction apparatus has the excellent activity for accelerating a carbon monoxide selective oxidation reaction at high temperatures as well as at low temperatures. Even when the loading connected to the fuel cells varies, this arrangement sufficiently lowers the concentration of carbon monoxide included in the hydrogen rich gas. The following describes first the method of manufacturing the lithium additive ruthenium catalyst with FIG. 1 and then the structure of the fuel cells system 10 and a reaction of reducing the concentration of carbon monoxide included in the hydrogen rich gas, which is carried out in the fuel cells system 10, with FIG. 2.

As shown in FIG. 1, the process of manufacturing the lithium additive ruthenium catalyst first provides porous alumina pellets, which are formed to have the mean particle diameter of approximately 3 mm, and soaks the alumina pellets in distilled water (step S100). The process separately provides an aqueous solution of lithium acetate and adds the aqueous solution of lithium acetate dropwise into the distilled water with the alumina pellets soaked therein with stirring, so as to make the lithium salt adsorbed on the alumina pellets (step S110). The process subsequently dries the alumina pellets with the lithium salt adsorbed thereon, so as to remove the water content (step S120), and heats the alumina pellets at 200° C. for about one hour (step S130). This gives the alumina pellets with lithium carried thereon. The procedure of this embodiment causes lithium to be carried on the alumina pellets at a rate of 0.005 mol/liter (moles of lithium carried per volume of the alumina pellets). The process then carries out the treatment for further making ruthenium carried on the alumina pellets, which is similar to the treatment above for making lithium carried on the alumina pellets.

The process soaks the lithium-carrying pellets in distilled water (step S140). The process then provides an aqueous solution of ruthenium chloride and adds the aqueous solution of ruthenium chloride dropwise into the distilled water with the lithium-carrying pellets soaked therein with stirring, so as to make the ruthenium salt adsorbed on the alumina pellets (step S150). The process subsequently dries the lithium-carrying pellets with the ruthenium salt adsorbed thereon, so as to remove the water content (step S160), and heats the lithium-carrying pellets in a hydrogen reducing atmosphere at 500° C. for about two hours (step S170). This reduces the ruthenium on the pellets and completes the lithium additive ruthenium catalyst. The procedure of this embodiment causes ruthenium to be carried on the lithium-carrying pellets at a rate of 0.036 mol/liter (moles of ruthenium carried per volume of the alumina pellets).

The method of manufacturing the lithium additive ruthenium catalyst discussed above uses lithium acetate to make lithium carried on the alumina pellets. Another salt may, however, be used instead. The lithium salt used here may be any salt arbitrarily selected among the group including lithium chloride, lithium acetate, and lithium sulfide, or any combination of these salts. Similarly the ruthenium salt used to make ruthenium carried on the alumina pellets is not restricted to the ruthenium chloride. The ruthenium salt used here may be any salt arbitrarily selected among the group including ruthenium nitrate, ruthenium iodide, chlororuthenic acid, ammonium chlororuthenate, ruthenium hydroxide, and potassium ruthenate, or any combination of these salts.

The structure of the fuel cells system 10 of the embodiment is described with FIG. 2. The fuel cells system 10 includes a methanol tank 12, a water tank 14, a fuel reformer unit 30, and a stack of fuel cells 20.

The methanol tank 12 is a reservoir of methanol, and the water tank 14 is a reservoir of water. Supplies of methanol and water are fed to the fuel reformer unit 30 via certain supply conduits. The fuel reformer unit 30 produces a hydrogen-containing gaseous fuel from the supplies of methanol and water. The fuel cells 20 receive a supply of the gaseous fuel produced by the fuel reformer unit 30 and a supply of an oxygen-containing oxidant gas and produce an electromotive force through the electrochemical reactions thereof.

Figure 3:
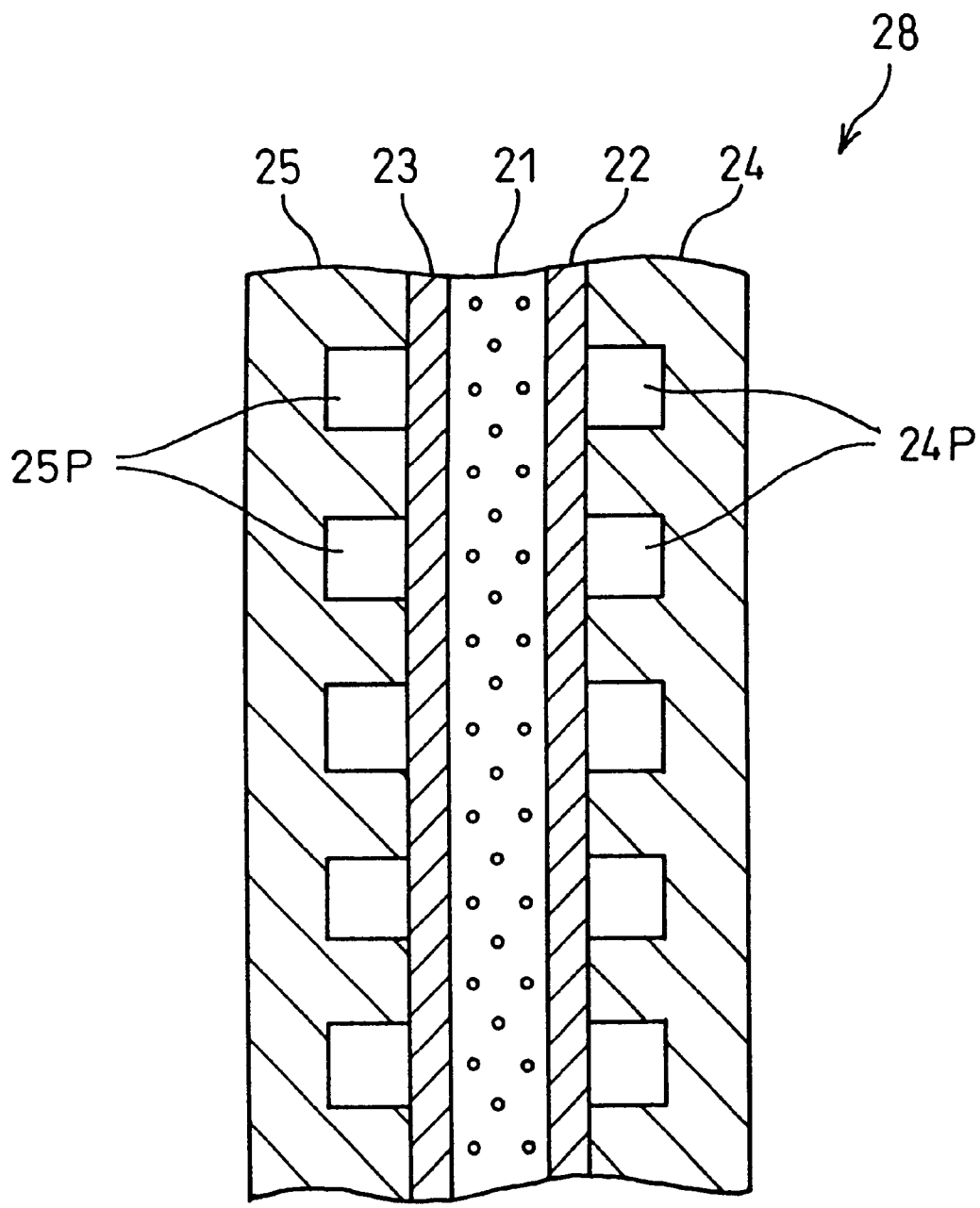
FIG. 3 is a sectional view schematically illustrating the structure of the unit cell 28 including in the stack of fuel cells 20.

The fuel cells 20 are polymer electrolyte fuel cells and have a stack structure obtained by laying a plurality of unit cells one upon another. FIG. 3 is a sectional view schematically illustrating the structure of a unit cell 28 included in the stack of fuel cells 20. The unit cells 28 includes an electrolyte membrane 21, an anode 22, a cathode 23, and a pair of separators 24 and 25.

The anode 22 and the cathode 23 are gas diffusion electrodes that are disposed across the electrolyte membrane 21 to have a sandwich-like structure. The separators 24 and 25 are further disposed across the sandwich-like structure and respectively connected with the anode 22 and the cathode 23 to form a flow path of gaseous fuel and a flow path of an oxidant gas. The flow path of the gaseous fuel 24P is defined by the anode 22 and the separator 24, whereas the flow path of the oxidant gas 25P is defined by the cathode 23 and the separator 25.

The electrolyte membrane 21 is a proton-conductive ion exchange membrane composed of a solid polymer material, for example, a fluororesin, and is coated with platinum or a platinum-containing alloy functioning as a catalyst. The anode 22 and the cathode 23 are composed of carbon cloth woven of carbon fiber yarns, or carbon paper or carbon felt of carbon fibers. The separators 24 and 25 are composed of a gas-impermeable conductive material, for example, gas-impermeable dense carbon produced by compressing carbon, and have ribs of a predetermined shape formed in the surface thereof. These ribs are combined with the surface of the anode 22 and the surface of the cathode 23 to form the flow path of the gaseous fuel 24P and the flow path of the oxidant gas 25P, respectively. Although the separators 24 and 25 are described here as independent elements, one separator having ribs formed in both faces thereof is interposed between adjoining unit cells 28 in the actual fuel cells 20.

The unit cell 28, which is a basic unit of the stack of fuel cells 20, is constructed as discussed above. Plural sets (100 sets in this embodiment) of the unit cells 28 are laid one upon another in such a manner that one separator is interposed between adjoining electrode-membrane assemblies, each including the anode 22, the electrolyte membrane 21, and the cathode 23, so as to constitute a fuel cell assembly. A pair of collector plates, which are composed of dense carbon or copper, are disposed across the fuel cell assembly. This completes the stack of fuel cells 20.

In the drawing of FIG. 1, only the supply system of the gaseous fuel fed to the anodes of the fuel cells 20 is explicitly illustrated. A non-illustrated oxidant gas supply system is connected to the cathodes of the fuel cells 20, in order to feed the pressurized air. A non-illustrated gaseous fuel discharge system and a non-illustrated oxidant gas discharge system are also connected to the fuel cells 20, in order to discharge a fuel gas exhaust and an oxidant gas exhaust from the fuel cells 20 after the electrochemical reactions on the respective electrodes.

The fuel reformer unit 30 includes a reformer 32, a CO selective oxidation unit 34, a carbon monoxide sensor 40, a blower 38, and a controller 70 as primary constituents. The reformer 32 receives supplies of methanol and water and produces a hydrogen-rich reformed gas. The CO selective oxidation unit 34 oxidizes carbon monoxide included in the reformed gas, so as to reduce the concentration of carbon monoxide included in the reformed gas and thereby produce a gaseous fuel having the concentration of carbon monoxide reduced to or below a predetermined level. The carbon monoxide sensor 40 is disposed in a connection conduit 36, through which the reformed gas produced by the reformer 32 is fed to the CO selective oxidation unit 34, and measures the concentration of carbon monoxide included in the reformed gas. The blower 38 introduces an oxygen-containing oxidant gas (the air in this embodiment) into the connection conduit 36 via an inlet pipe 39, which is connected to the connection conduit 36 at a place downstream the carbon monoxide sensor 40. The controller 70 controls the driving conditions of the respective constituents of the fuel reformer unit 30. The respective constituents of the fuel reformer unit 30 are described below in detail.

The reformer 32 receives a supply of methanol fed from the methanol tank 12 and a supply of water fed from the water tank 14 and produces a reformed gas containing hydrogen and carbon dioxide through the steam reforming reactions expressed by Equations (4) through (6) given above. As mentioned previously, it is practically impossible that the reforming reaction of carbon monoxide shown by Equation (5) completely proceeds. The reformed gas accordingly contains a certain amount of carbon monoxide as a side product. The concentration of carbon monoxide included in the reformed gas depends upon the type of the catalyst used in the reformer 32, the driving temperature of the reformer 32, and the flows of methanol and water supplied to the reformer 32 per unit volume of the catalyst. In this embodiment, the Cu—Zn catalyst is used in the reformer 32.

The Cu—Zn catalyst used here is a metal oxide manufactured by a known coprecipitation process and is formed in tables of approximately 3 mm in diameter. The reformer 32 is filled with the tablets of the Cu—Zn catalyst. The supplies of methanol and water are vaporized by a non-illustrated evaporator, which is disposed upstream the reformer 32, and the gaseous mixture of methanol and water is fed as the crude fuel gas to the reformer 32. The crude fuel gas introduced into the reformer 32 is exposed to the Cu—Zn catalyst and subjected to the reforming reactions proceeding on the Cu—Zn catalyst. With a progress of the reforming reactions, hydrogen and carbon dioxide are produced, and a hydrogen-rich reformed gas is fed into the connection conduit 36.

The reforming reactions proceeding in the reformer 32 are endothermic as a whole (the reaction of Equation (6)). The reformer 32 accordingly has a non-illustrated combustion unit, in order to obtain the heat required for the reaction. The combustion unit receives a supply of methanol fed from the methanol tank 12 as a fuel for combustion. The quantity of methanol fed to the combustion unit is regulated, so that the driving temperature of the reformer 32 is controlled in the range of 220 to 300° C. The reformer 32 is connected to the controller 70, which regulates the supply of methanol fed to the combustion unit and the supplies of methanol and water fed to the reformer 32.

Figure 4:
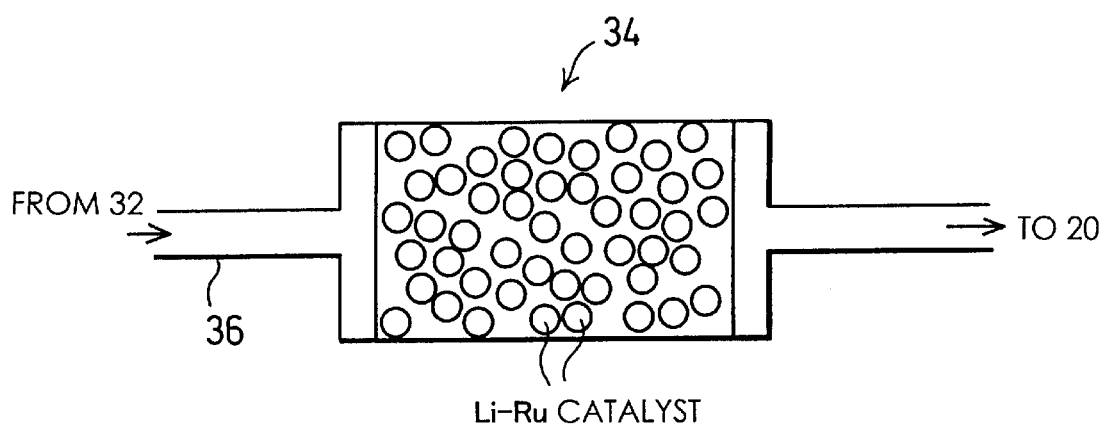
FIG. 4 schematically illustrates the structure of a CO selective oxidizing unit 34.

The CO selective oxidation unit 34 receives a supply of the reformed gas produced by the reformer 32 and a supply of the oxidant gas and oxidizes carbon monoxide included in the reformed gas in preference to hydrogen, so as to change the reformed gas to a gaseous fuel having the reduced concentration of carbon monoxide. Namely the CO selective oxidation unit 34 works as the carbon monoxide concentration reduction unit in the fuel reformer unit 30. The structure of the CO selective oxidation unit 34 is schematically illustrated in FIG. 4. The CO selective oxidation unit 34 is filled with the lithium additive ruthenium catalyst described previously, that is, the alumina pellets with lithium and ruthenium carried thereon, as the carbon monoxide selective oxidation catalyst.

When the supply of the reformed gas is fed from the reformer 32 via the connection conduit 36 to the CO selective oxidation unit 34, the carbon monoxide selective oxidation reaction proceeds while the reformed gas passes through the surface of the lithium additive ruthenium catalyst, so as to reduce the concentration of carbon monoxide included in the reformed gas. The reformed gas having the reduced concentration of carbon monoxide is discharged from the CO selective oxidation unit 34 and fed as the gaseous fuel to the fuel cells 20. The concentration of carbon monoxide included in the resulting gaseous fuel, which is obtained by reducing the concentration of carbon monoxide in the reformed gas fed to the CO selective oxidation unit 34, depends upon the driving temperature of the CO selective oxidation unit 34, the concentration of carbon monoxide included in the reformed gas fed to the CO selective oxidation unit 34, and the flow (space velocity) of the reformed gas fed to the CO selective oxidation unit 34 per unit volume of the catalyst.

The carbon monoxide sensor 40 is disposed in the connection conduit 36 as described previously, and measures the concentration of carbon monoxide included in the reformed gas, which is fed to the CO selective oxidation unit 34 via the connection conduit 36. The carbon monoxide sensor 40 is connected to the controller 70 and outputs a piece of information regarding the observed concentration of carbon monoxide included in the reformed gas to the controller 70.

The blower 38 feeds the air used for oxidizing carbon monoxide to the CO selective oxidation unit 34 as described previously. The blower 38 is connected to the controller 70 and receives a driving signal output from the controller 70, so as to feed a predetermined quantity of the air to the CO selective oxidation unit 34. As discussed above, the controller 70 receives, from the carbon monoxide sensor 40, the piece of information regarding the observed concentration of carbon monoxide included in the reformed gas fed to the CO selective oxidation unit 34. The controller 70 outputs the driving signal to the blower 38, based on this piece of information. The blower 38 accordingly supplies the predetermined quantity of the air, which corresponds to the concentration of carbon monoxide included in the reformed gas fed to the CO selective oxidation unit 34, to the CO selective oxidation unit 34.

The controller 70 is constructed as a logic circuit including a microcomputer. Specifically the controller 70 includes a CPU 72 that carries out a variety of operations according to preset control programs, a ROM 74 in which control programs and control data required for the variety of operations carried out by the CPU 72 are stored in advance, a RAM 76 which various data required for the variety of operations carried out by the CPU 72 are temporarily written in and read from, and an input-output port 78 that receives detection signals output from the carbon monoxide sensor 40 and outputs driving signals to the reformer 32, the CO selective oxidation unit 34, the blower 38, and the carbon monoxide sensor 40 based on the results of the operations carried out by the CPU 72.

In the fuel cells system 10 of the above structure, the CO selective oxidation unit 34 includes the lithium additive ruthenium catalyst, which works as the carbon monoxide selective oxidation catalyst as described above. This arrangement enables the concentration of carbon monoxide included in the reformed gas fed from the reformer 32 to be sufficiently reduced and causes the processed gas to be supplied as the gaseous fuel to the fuel cells 20. The performance of the lithium additive ruthenium catalyst used as the carbon monoxide selective oxidation catalyst was examined. FIG. 5 shows the observed performances of reducing the concentration of carbon monoxide included in the hydrogen rich gas under a variety of temperature conditions, with regard to a prior art ruthenium catalyst conventionally used as the carbon monoxide selective oxidation catalyst and the lithium additive ruthenium catalyst of this embodiment.

The ruthenium catalyst used as the comparative example was produced by carrying out the treatment of steps S140 through S170 in the method of manufacturing the lithium additive ruthenium catalyst shown in the flowchart of FIG. 1 and making only ruthenium carried on the alumina pellets. The quantity of ruthenium carried on the alumina pellets (moles of ruthenium carried per volume of the alumina pellets) was 0.036 mol/liter.

The performance of each carbon monoxide selective oxidation catalyst shown in FIG. 5 was examined in the following manner. A reaction vessel having a volume of approximately 10 cm$^3$ was filled with each catalyst, and a model gas, which had a typical composition of the reformed gas fed from the reformer 32 to the CO selective oxidation unit 34 in the fuel cells system 10, was fed to the reaction vessel filled with the catalyst. The model gas used here was obtained by moistening a bomb gas, which had the composition of $H_2$=75%, $CO_2$=24.5%, and CO=0.5% in the dry state, with bubbled water of 60° C. This moistening process regulated the humidity of the model gas to have substantially the same humidity condition as that of the reformed gas, which was obtained by the steam reforming reaction of methanol at a molar ratio of water to methanol [$H_2O$]/[$CH_3OH$]=2. The moistened model gas was mixed with the air used as the oxidant of carbon monoxide and introduced into the reaction vessel filled with the catalyst. The quantity of the air, which was mixed as the oxidant of carbon monoxide with the model gas, was regulated to attain a molar ratio of oxygen to carbon monoxide included in the model gas [$O_2$]/[CO]=3. The model gas moistened and mixed with the air was introduced into the reaction vessel filled with the catalyst at a flow of 800 cm$^3$/min.

The model gas was introduced into the reaction vessels filled respectively with the lithium additive ruthenium catalyst of the embodiment and with the ruthenium catalyst of the comparative example. The selective oxidation of carbon monoxide proceeded in the respective reaction vessels, and the reformed gases having the reduced concentrations of carbon monoxide were discharged from the respective reaction vessels. The concentration of carbon monoxide in each reformed gas was measured by gas chromatography. The test to examine the performance of each catalyst for reducing the concentration of carbon monoxide was carried out under the temperature conditions of 100° C., 140° C., and 200° C.

As shown in FIG. 5, the lithium additive ruthenium catalyst of the embodiment sufficiently reduced the concentration of carbon monoxide included in the hydrogen rich gas under any temperature conditions of 100° C., 140° C., and 200° C. The known ruthenium catalyst of the comparative example reduced the concentration of carbon monoxide to levels equivalent to those of the lithium additive ruthenium catalyst under the temperature conditions of 140° C. and 200° C. In the case of the catalytic temperature equal to 100° C., however, the ruthenium catalyst had the significantly poorer performance of reducing the concentration of carbon monoxide than the lithium additive ruthenium catalyst. The lithium additive ruthenium catalyst of this embodiment accordingly extends the effective temperature range, in which the concentration of carbon monoxide is sufficiently reduced, to the lower temperature, and enables the concentration of carbon monoxide included in the hydrogen rich gas to be sufficiently reduced in the wider temperature range of 100° C. to 200° C.

The use of the lithium additive ruthenium catalyst facilitates the regulation of the internal temperature of the CO selective oxidation unit 34, which is filled with the lithium additive ruthenium catalyst, and simplifies the structure of the whole fuel cells system 10. The CO selective oxidation unit 34 has the wider effective temperature range extended to the low temperatures, in which the concentration of carbon monoxide included in the hydrogen rich gas is sufficiently reduced. Even when the temperature in the vicinity of the outlet of the CO selective oxidation unit 34 is regulated to the lower level than the prior art technique, the arrangement of this embodiment enables the concentration of carbon monoxide included in the hydrogen rich gas to be sufficiently reduced. This makes the temperature of the gaseous fuel discharged from the CO selective oxidation unit 34 closer to the driving temperature of the fuel cells 20. This arrangement thus simplifies or even omits the structure of decreasing the temperature of the gaseous fuel, prior to the supply of the gaseous fuel from the Co selective oxidation unit 34 to the fuel cells 20.

The lithium additive ruthenium catalyst of the embodiment has the sufficient activity even under the high temperature condition of about 200° C., like the known ruthenium catalyst. The reformed gas discharged from the reformer 32 can thus be directly introduced into the CO selective oxidation unit 34 to be subjected to the carbon monoxide selective oxidation reaction. The reforming reaction generally proceeds in the reformer 32 filled with the Cu—Zn catalyst in the temperature range of 250 to 300° C. The temperature of the reformed gas fed from the reformer 32 to the CO selective oxidation unit 34 is hence approximately 200° C. The reformed gas can thus be directly subjected to the carbon monoxide selective oxidation reaction. The carbon monoxide selective oxidation reaction is exothermic. It is accordingly preferable to cool down the internal temperature of the CO selective oxidation unit 34, for example, by circulating the cooling water, to have the mean catalytic temperature of not higher than about 200° C. and the catalytic temperature of approximately 100° C. in the vicinity of the outlet. This simplifies the piping layout for connecting the reformer 32 with the CO selective oxidation unit 34 and further with the fuel cells 20.

The lithium additive ruthenium catalyst of the embodiment has the wider effective temperature range, in which the concentration of carbon monoxide included in the hydrogen rich gas is sufficiently reduced, compared with the known ruthenium catalyst. This extends the allowable range of the catalytic temperature in the CO selective oxidation unit 34 and thus facilitates the temperature control in the CO selective oxidation unit 34. The extended allowable range of the catalytic temperature in the CO selective oxidation unit 34 enables the CO selective oxidation unit 34 to stably carry out the reduction of the concentration of carbon monoxide, even when the loading connected to the fuel cells 20 significantly varies. The variation in loading changes the quantity of the reformed gas fed to the CO selective oxidation unit 34 and varies the calorimetric value produced by the carbon monoxide selective oxidation reaction proceeding in the CO selective oxidation unit 34, so as to vary the internal temperature of the CO selective oxidation unit 34. The extended allowable range of the catalytic temperature desirably prevents the varying internal temperature of the CO selective oxidation unit 34 from being deviated from the effective temperature range, in which the concentration of carbon monoxide included in the hydrogen rich gas is sufficiently reduced, and ensures the continuous production of the gaseous fuel having the sufficiently low concentration of carbon monoxide.

The embodiment discussed above exerts the above effects by utilizing the lithium additive ruthenium catalyst, which is obtained by making both ruthenium and lithium carried on the alumina pellets, and thereby extending the effective temperature range, in which the sufficient activity for accelerating the carbon monoxide selective oxidation reaction is ensured, to the low temperatures, compared with the known ruthenium catalyst. Catalysts having a second element other than lithium in addition to ruthenium and exerting the effects equivalent to those of the lithium additive ruthenium catalyst are discussed below.

Potassium, which is one of alkali metals other than lithium, barium, which is one of alkaline earth metals, nickel, and zinc are used as the second element that improves, like lithium, the activity of the ruthenium catalyst to accelerate the carbon monoxide selective oxidation reaction. In the following description, in the same manner as the lithium additive ruthenium catalyst, the catalyst including, for example, potassium as the second element is referred to as the potassium additive ruthenium catalyst.

The catalyst including the second element in addition to ruthenium was manufactured according to the same procedure as that of the lithium additive ruthenium catalyst shown in the flowchart of FIG. 1. In the case of the potassium additive ruthenium catalyst, the process of step S110 in the flowchart of FIG. 1 used an aqueous solution of potassium acetate, in place of the aqueous solution of lithium acetate, so as to make the potassium salt adsorbed on the alumina pellets. In the case of the barium additive ruthenium catalyst, the process of step S110 in the flowchart of FIG. 1 used an aqueous solution of barium acetate, so as to make the barium salt adsorbed on the alumina pellets. In the case of the nickel additive ruthenium catalyst, the process used an aqueous solution of nickel nitrate, so as to make the nickel salt adsorbed on the alumina pellets. In the case of the zinc additive ruthenium catalyst, the process used an aqueous solution of zinc nitrate, so as to make the zinc salt adsorbed on the alumina pellets. Like the lithium additive ruthenium catalyst discussed previously, in any of these catalysts, the second element was carried on the alumina pellets at the rate of 0.005 mol/liter (moles of the second element carried per volume of the alumina pellets). Ruthenium was carried on the alumina pellets at the rate of 0.036 mol/liter (moles of ruthenium carried per volume of the alumina pellets).

FIG. 5 shows the observed performances of reducing the concentration of carbon monoxide included in the hydrogen rich gas under the variety of temperature conditions with regard to the ruthenium catalysts having the second element other than lithium added, as well as the performance of the lithium additive ruthenium catalyst described above. The test was carried out under the same conditions as those for the lithium additive ruthenium catalyst. As shown in FIG. 5, like the lithium additive ruthenium catalyst, the ruthenium catalysts having the second element other than lithium sufficiently reduced the concentration of carbon monoxide included in the hydrogen rich gas under any temperature conditions of 100° C., 140° C., and 200° C. Like the lithium additive ruthenium catalyst, the ruthenium catalysts having the second element other than lithium accordingly extend the effective temperature range, in which the concentration of carbon monoxide is sufficiently reduced, to the low temperatures, and enable the concentration of carbon monoxide included in the hydrogen rich gas to be sufficiently reduced in the wider temperature range of 100° C. to 200° C.

The application of any one of the ruthenium catalysts having the second element for the CO selective oxidation unit incorporated in a fuel cells system, which has the similar structure to that of the fuel cells system 10 of the above embodiment, facilitates the regulation of the internal temperature of the CO selective oxidation unit and simplifies the structure of the whole fuel cells system. When any of these catalysts is used, the effective temperature range, in which the concentration of carbon monoxide included in the hydrogen rich gas is sufficiently reduced, is extended to the lower temperature. This arrangement allows the regulation of the temperature in the vicinity of the outlet of the CO selective oxidation unit to the lower level than the prior art technique and makes the temperature of the gaseous fuel discharged from the CO selective oxidation unit closer to the driving temperature of the fuel cells. This arrangement desirably simplifies or even omits the structure of decreasing the temperature of the gaseous fuel, prior to the supply of the gaseous fuel from the CO selective oxidation unit to the fuel cells.

The ruthenium catalysts having the second element have the sufficient activity even under the high temperature condition of about 200° C., like the known ruthenium catalyst and the lithium additive ruthenium catalyst of the embodiment. The reformed gas discharged from the reformer can thus be directly introduced into the CO selective oxidation unit to be subjected to the carbon monoxide selective oxidation reaction. It is accordingly preferable to cool down the internal temperature of the CO selective oxidation unit, for example, by circulating the cooling water, to have the mean catalytic temperature of not higher than about 200° C. and the catalytic temperature of approximately 100° C. in the vicinity of the outlet. This simplifies the piping layout for connecting the reformer with the CO selective oxidation unit and further with the fuel cells.

Like the lithium additive ruthenium catalyst of the embodiment, the ruthenium catalysts having the second element have the wider effective temperature range, in which the concentration of carbon monoxide included in the hydrogen rich gas is sufficiently reduced, compared with the known ruthenium catalyst. This extends the allowable range of the catalytic temperature in the CO selective oxidation unit and thus facilitates the temperature control in the CO selective oxidation unit. As described previously, the extended allowable range of the catalytic temperature in the CO selective oxidation unit enables the CO selective oxidation unit to stably carry out the reduction of the concentration of carbon monoxide, even when the loading connected to the fuel cells significantly varies.

In the above examples, potassium acetate, barium acetate, nickel nitrate, and zinc nitrate are respectively used to manufacture the potassium additive ruthenium catalyst, the barium additive ruthenium catalyst, the nickel additive ruthenium catalyst, and the zinc additive ruthenium catalyst. Other compounds adequately selected among nitrates, acetates, chlorides, and sulfides may, however, be used for the preparation. The material for making ruthenium carried on the carrier is not restricted to ruthenium chloride, but other ruthenium compounds used for the preparation of the lithium additive ruthenium catalyst may be used instead.

The applicant of the present invention has already proposed the platinum-ruthenium alloy catalyst as the catalyst that has a second element in addition to ruthenium and accelerates the carbon monoxide selective oxidation reaction (JAPANESE PATENT LAID-OPEN GAZETTE No. 9-30802). The proposed platinum-ruthenium alloy catalyst also significantly improves the activity of accelerating the carbon monoxide selective oxidation reaction, compared with the known ruthenium catalyst (including no second element). The ruthenium catalysts having lithium or any one of the second elements described above have the better effects than the proposed platinum-ruthenium alloy catalyst as discussed below. The reverse shift reaction proceeds in the course of the carbon monoxide selective oxidation reaction and may interfere with the sufficient reduction of the concentration of carbon monoxide included in the reformed gas. Like the known ruthenium catalyst, the ruthenium catalysts having lithium or any one of the second elements described above have the activity of accelerating methanation that changes carbon monoxide produced in the course of the reverse shift reaction to methane, thereby sufficiently reducing the concentration of carbon monoxide included in the reformed gas. The methanation of carbon monoxide is expressed as:

$$CO + 3H_2 \rightarrow CH_4 + H_2O \qquad (9)$$

The ruthenium catalyst originally has the activity of accelerating the methanation of carbon monoxide shown by Equation (9). Addition of lithium or any one of the second elements described above to the ruthenium catalyst does not significantly lower this activity of accelerating the methanation. Since the reverse shift reaction is endothermic, the effects of accelerating the methanation shown by Equation (9) are prominent especially in the high temperature range of the catalyst used in the CO selective oxidation unit. The proposed platinum-ruthenium alloy catalyst having the activity of accelerating the methanation like the known ruthenium catalyst, on the other hand, further activates the reverse shift reaction, which may interfere with the further reduction of the concentration of carbon monoxide included in the reformed gas by the methanation. The ruthenium catalysts having lithium or any one of the second elements described above accelerate the methanation to sufficiently consume carbon monoxide produced in the process of the reverse shift reaction and more effectively reduce the concentration of carbon monoxide included in the reformed gas than the proposed platinum-ruthenium alloy catalyst. Lithium and other second elements used in the present invention are not so expensive as platinum and thereby reduce the manufacturing cost of the carbon monoxide selective oxidation catalyst, compared with the manufacturing cost of the proposed platinum-ruthenium alloy catalyst.

In the embodiment discussed above, lithium or another second element added with ruthenium is carried on the alumina pellets at the rate of 0.005 mol/liter, and ruthenium is carried at the rate of 0.036 mol/liter. The quantities of carriage of the second element and ruthenium are, however, not restricted to these values. Namely the molar ratio of the second element to ruthenium, which is equal to 0.14 in the above embodiment, may be varied adequately. The excessively large content of the second element causes the surface of ruthenium, which is present in the form of particles on the carrier, to be covered with the second element and decreases the specific surface area of ruthenium. This undesirably lowers the ability of the CO selective oxidation unit including the carbon monoxide selective oxidation catalyst, that is, the maximum space velocity to sufficiently reduce the concentration of carbon monoxide included in the supply of the hydrogen rich gas. The molar ratio of the second element to ruthenium may be set to a value greater than 0.14, as long as the ability of reducing the concentration of carbon monoxide in the hydrogen rich gas fed to the CO selective oxidation unit is sufficiently ensured. The excessively small content of the second element, on the other hand, may result in the insufficient improvement in activity of accelerating the carbon monoxide selective oxidation reaction. The molar ratio of the second element to ruthenium may be set to a value smaller than 0.14, as long as the second element is homogeneously dispersed in the vicinity of the ruthenium particles and sufficiently exerts its effects. The molar ratio of the second element to ruthenium, that is, the quantities of carriage of the second element and ruthenium, is regulated appropriately by varying the weight ratio of the aqueous solution of the second element-containing salt to the alumina pellets and by varying the weight ratio of the aqueous solution of the ruthenium salt to the alumna pellets in the process of manufacturing the catalyst.

The technique of the embodiment discussed above makes the second element first and ruthenium next carried on the alumina pellets. Unless the second element covers the surface of ruthenium and decreases the specific surface area of ruthenium to cause the above problems, the second element may be carried on the alumina pellets after the carriage of ruthenium. Alternatively ruthenium and the second element may be carried simultaneously on the alumina pellets.

Ruthenium and the second element may be alloyed in the process of manufacturing each of the carbon monoxide selective oxidation catalysts of the embodiment. The alloy of ruthenium and the second element makes ruthenium and the second element closer to each other microscopically. It is accordingly expected to further activate the interaction between ruthenium and the second element working as the carbon monoxide selective oxidation catalyst.

The ruthenium catalysts having the second element may be manufactured by any method other than the manufacturing method discussed in the embodiment, as long as the resulting catalysts can have the sufficient catalytic activity. One modified method adds the second element in the process of manufacture of the alumina pellets, instead of making the second element carried on the alumina pellets. Any method is applicable, as long as the second element is present in the vicinity of ruthenium in the resulting catalyst to ensure the improvement in activity of accelerating the carbon monoxide selective oxidation reaction.

A honeycomb may be used as the carrier, instead of the alumina pellets. In this case, the catalyst manufactured by the procedure of the above embodiment (that is, the catalyst obtained by making ruthenium and the second element carried on the alumina pellets) is ground and coated on a metal honeycomb. Another application coats a honeycomb with alumina and causes ruthenium and the second element to be carried on the alumina-coated honeycomb in the same manner as the technique of the above embodiment. These applications give the catalyst-carrying honeycombs.

The technique of the embodiment discussed above uses alumina as the carrier of the metal catalyst having the activity of accelerating the carbon monoxide selective oxidation reaction. Any other carriers may, however, be used, as long as they enable ruthenium and any one of the second elements described above to be carried thereon, so as to ensure the sufficient activity of accelerating the carbon monoxide selective oxidation reaction.

The present invention is not restricted to the above embodiment or its modifications, but there may be many other modifications, changes, and alterations without departing from the scope or spirit of the main characteristics of the present invention.

INDUSTRIAL APPLICABILITY

As described above, the carbon monoxide concentration reduction apparatus, the method of reducing the concentration of carbon monoxide, and the carbon monoxide selective oxidation catalyst of the present invention are effective in the gaseous fuel supply system that feeds a supply of the hydrogen rich gas to the fuel cells and are used, for example, in electric vehicles that utilize the fuel cells as the driving power source.

What is claimed is:

1. A method of oxidizing carbon monoxide included in a hydrogen rich gas and thereby reducing a concentration of carbon monoxide in the hydrogen rich gas, the method comprising the steps of:

mixing the hydrogen rich gas with an oxygen-containing oxidant gas for oxidizing carbon monoxide; and oxidizing carbon monoxide included in the hydrogen rich gas which has been mixed with the oxidant gas, in the presence of a carbon monoxide selective oxidation catalyst through a carbon monoxide selective oxidation reaction for selectively oxidizing carbon monoxide wherein the carbon monoxide selective oxidation catalyst accelerates the carbon monoxide selective oxidation reaction and comprises ruthenium as a primary component and an alkali metal that extends an effective temperature range in which the carbon monoxide selective oxidation reaction is accelerated, and wherein the alkali metal is in a form of an alloy with the ruthenium or in a form of a simple body.

2. A method in accordance with claim 1, wherein the alkali metal is lithium or potassium.

3. A method in accordance with claim 1, wherein the effective temperature range is 100° C. to 200° C.

4. A method in accordance with claim 1, wherein the method further comprises obtaining the hydrogen rich gas including carbon monoxide therein from a reformer that converts $CH_3OH$ and $H_2O$ to the hydrogen rich gas.

5. A method of oxidizing carbon monoxide included in a hydrogen rich gas and thereby reducing a concentration of carbon monoxide in the hydrogen rich gas, the method comprising the steps of:

mixing the hydrogen rich gas with an oxygen-containing oxidant gas for oxidizing carbon monoxide; and oxidizing carbon monoxide included in the hydrogen rich gas, which has been mixed with the oxidant gas, in the presence of a carbon monoxide selective oxidation catalyst through a carbon monoxide selective oxidation reaction for selectively oxidizing carbon monoxide wherein the carbon monoxide selective oxidation catalyst accelerates the carbon monoxide selective oxidation reaction, and comprises ruthenium as a primary component and an alkaline earth metal that extends an effective temperature range in which the carbon monoxide selective oxidation reaction is accelerated, and wherein the alkaline earth metal is in a form of an alloy with the ruthenium or in a form of a simple body.

6. A method in accordance with claim 5, wherein the alkaline earth metal is barium.

7. A method of oxidizing carbon monoxide included in a hydrogen rich gas and thereby reducing a concentration of carbon monoxide in the hydrogen rich gas, the method comprising the steps of:

mixing the hydrogen rich gas with an oxygen-containing oxidant gas for oxidizing carbon monoxide; and reducing the concentration of carbon monoxide included in the hydrogen rich gas, which has been mixed with the oxidant gas, in the presence of a carbon monoxide selective oxidation catalyst through a carbon monoxide selective oxidation reaction for selectively oxidizing carbon monoxide wherein the carbon monoxide selective oxidation catalyst accelerates the carbon monoxide selective oxidation reaction, and comprises ruthenium as a primary component and nickel.

8. A method of oxidizing carbon monoxide included in a hydrogen rich gas and thereby reducing a concentration of carbon monoxide in the hydrogen rich gas, the method comprising the steps of:

mixing the hydrogen rich gas with an oxygen-containing oxidant gas for oxidizing carbon monoxide; and reducing the concentration of carbon monoxide included in the hydrogen rich gas, which has been mixed with the oxidant gas, in the presence of a carbon monoxide selective oxidation catalyst through a carbon monoxide selective oxidation reaction for selectively oxidizing carbon monoxide using a carbon monoxide selective oxidation catalyst, wherein the carbon monoxide selective oxidation catalyst accelerates the carbon monoxide selective oxidation reaction, and comprises ruthenium as a primary component and zinc.

9. A carbon monoxide selective oxidation catalyst, which accelerates a carbon monoxide selective oxidation reaction that selectively oxidizes carbon monoxide included in a hydrogen rich gas, the carbon monoxide selective oxidation catalyst having ruthenium as a primary component, which is carried on a predetermined carrier, and further including an alkali metal that, in combination with ruthenium, extends an effective temperature range in which the carbon monoxide selective oxidation reaction is accelerated, the alkali metal being in a form of an alloy with the ruthenium or in a form of a simple body.

10. A carbon monoxide selective oxidation catalyst in accordance with claim 9, wherein the alkali metal is in the form of a simple body obtained by reducing an alkali metal salt.

11. A carbon monoxide selective oxidation catalyst in accordance with claim 9, wherein the alkali metal is lithium or potassium.

12. A carbon monoxide selective oxidation catalyst, which accelerates a carbon monoxide selective oxidation reaction that selectively oxidizes carbon monoxide included in a hydrogen rich gas, the carbon monoxide selective oxidation catalyst having ruthenium as a primary component, which is carried on a predetermined carrier, and further including an alkaline earth metal that, in combination with ruthenium, extends an effective temperature range in which the carbon monoxide selective oxidation reaction is accelerated, the alkaline earth metal being in a form of an alloy with the ruthenium or in a form of a simple body.

13. A carbon monoxide selective oxidation catalyst accordance with claim 12, wherein the alkaline earth metal is in the form of a simple body obtained by reducing an alkaline earth metal salt.

14. A carbon monoxide selective oxidation catalyst in accordance with claim 12, wherein the alkaline earth metal is barium.

15. A carbon monoxide selective oxidation catalyst, which accelerates a carbon monoxide selective oxidation reaction that selectively oxidizes carbon monoxide included in a hydrogen rich gas, the carbon monoxide selective oxidation catalyst having ruthenium as a primary component, which is carried on a predetermined carrier, and further including nickel.

16. A carbon monoxide selective oxidation catalyst, which accelerates a carbon monoxide selective oxidation reaction that selectively oxidizes carbon monoxide included in a hydrogen rich gas, the carbon monoxide selective oxidation catalyst having ruthenium as a primary component, which is carried on a predetermined carrier, and further including zinc.

17. A carbon monoxide concentration reduction apparatus that oxidizes carbon monoxide included in a hydrogen rich gas and thereby reduces a concentration of carbon monoxide in the hydrogen rich gas, the apparatus comprising:

a hydrogen rich gas supply unit that feeds a supply of the hydrogen rich gas;

an oxidant gas supply unit that feeds a supply of an oxygen containing oxidant gas, which is used to oxidize carbon monoxide; and a carbon monoxide selective oxidation unit that includes a carbon monoxide selective oxidation catalyst, that receives the supply of the hydrogen rich gas fed from the hydrogen rich gas supply unit and that receives the supply of the oxidant gas fed from the oxidant gas supply unit, and that selectively oxidizes the carbon monoxide included in the hydrogen rich gas through a carbon monoxide selective oxidation reaction for selectively oxidizing carbon monoxide, the carbon monoxide selective oxidation catalyst accelerating the carbon monoxide selective oxidation reaction and comprising ruthenium as a primary component and an alkali metal that, in combination with the ruthenium, extends an effective temperature range in which the carbon monoxide selective oxidation reaction is accelerated, and wherein the alkali metal is in a form of an alloy with the ruthenium or in a form of a simple body.

18. A carbon monoxide concentration reduction apparatus in accordance with claim 17, wherein the alkali metal is lithium or potassium.

19. A carbon monoxide concentration reduction apparatus in accordance with claim 17, wherein the hydrogen rich gas supply unit is a reformer that converts a feed comprised of $CH_3OH$ and $H_2O$ to the hydrogen rich gas.

20. A carbon monoxide concentration reduction apparatus in accordance with claim 17, wherein the alkali metal is in the form of a simple body obtained by reducing an alkali metal salt.

21. A carbon monoxide concentration reduction apparatus that oxidizes carbon monoxide included in a hydrogen rich gas and thereby reduces a concentration of carbon monoxide in the hydrogen rich gas, the apparatus comprising:

a hydrogen rich gas supply unit that feeds a supply of the hydrogen rich gas;

an oxidant gas supply unit that feeds a supply of an oxygen-containing oxidant gas, which is used to oxidize carbon monoxide; and a carbon monoxide selective oxidation unit that includes a carbon monoxide selective oxidation catalyst, that receives the supply of the hydrogen rich gas fed from the hydrogen rich gas supply unit and that receives the supply of the oxidant gas fed from the oxidant gas supply unit, and that selectively oxidizes the carbon monoxide included in the hydrogen rich gas through a carbon monoxide selective oxidation reaction for selectively oxidizing carbon monoxide, the carbon monoxide selective oxidation catalyst accelerating the carbon monoxide selective oxidation reaction and comprising ruthenium as a primary component and an alkaline earth metal that, in combination with the ruthenium, extends an effective temperature range in which the carbon monoxide selective oxidation reaction is accelerated, and wherein the alkaline earth metal is in a form of an alloy with the ruthenium or in a form of a simple body.

22. A carbon monoxide concentration reduction apparatus in accordance with claim 21, wherein the alkaline earth metal is barium.

23. A carbon monoxide concentration reduction apparatus in accordance with claim 21, wherein the hydrogen rich gas supply unit is a reformer that converts a feed comprised of $CH_3OH$ and $H_2O$ to the hydrogen rich gas.

24. A carbon monoxide concentration reduction apparatus in accordance with claim 21, wherein the alkaline earth metal is in the form of a simple body obtained by reducing an alkaline earth metal salt.

25. A carbon monoxide concentration reduction apparatus that oxidizes carbon monoxide included in a hydrogen rich gas and thereby reduces a concentration of carbon monoxide in the hydrogen rich gas, the apparatus comprising:

a hydrogen rich gas supply unit that feeds a supply of the hydrogen rich gas;

an oxidant gas supply unit that feeds a supply of an oxygen-containing oxidant gas, which is used to oxidize carbon monoxide; and a carbon monoxide selective oxidation unit that includes a carbon monoxide selective oxidation catalyst, that receives the supply of the hydrogen rich gas fed from the hydrogen rich gas supply unit and that receives the supply of the oxidant gas fed from the oxidant gas supply unit, and that selectively oxidizes the carbon monoxide included in the hydrogen rich gas through a carbon monoxide selective oxidation reaction for selectively oxidizing carbon monoxide, the carbon monoxide selective oxidation catalyst accelerating the carbon monoxide selective oxidation reaction and comprising ruthenium as a primary component and nickel.

26. A carbon monoxide concentration reduction apparatus that oxidizes carbon monoxide included in a hydrogen rich gas and thereby reduces a concentration of carbon monoxide in the hydrogen rich gas, the apparatus comprising:

a hydrogen rich gas supply unit that feeds a supply of the hydrogen rich gas;

an oxidant gas supply unit that feeds a supply of an oxygen containing oxidant gas, which is used to oxidize carbon monoxide; and a carbon monoxide selective oxidation unit that includes a carbon monoxide selective oxidation catalyst, that receives the supply of the hydrogen rich gas fed from the hydrogen rich gas supply unit and that receives the supply of the oxidant gas fed from the oxidant gas supply unit, and that selectively oxidizes the carbon monoxide included in the hydrogen rich gas through a carbon monoxide selective oxidation reaction for selectively oxidizing carbon monoxide, the carbon monoxide selective oxidation catalyst accelerating the carbon monoxide selective oxidation reaction and comprising ruthenium as a primary component and zinc.

* * * * *